Oct. 14, 1924. 1,511,844
G. J. SHAVE
ROAD VEHICLE FOR PASSENGERS
Filed March 10, 1923    2 Sheets-Sheet 1
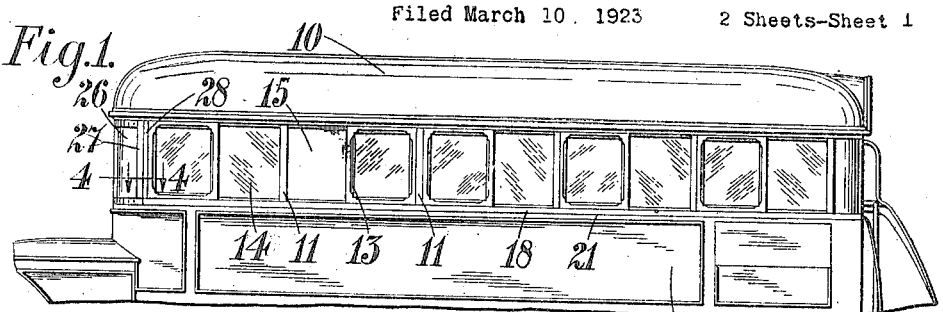
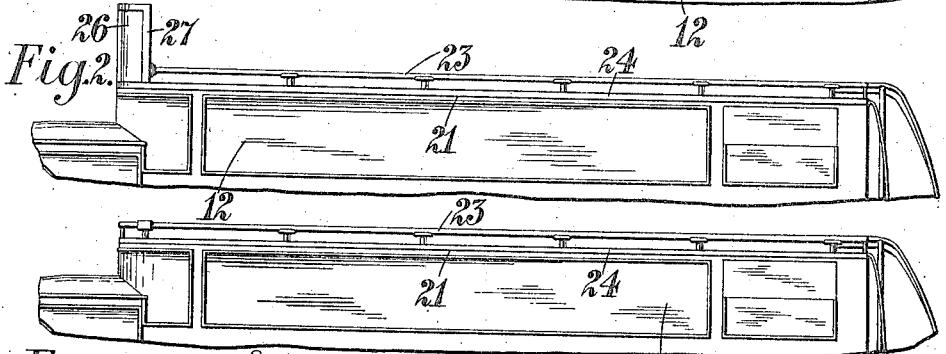
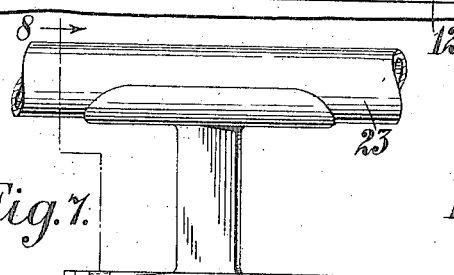
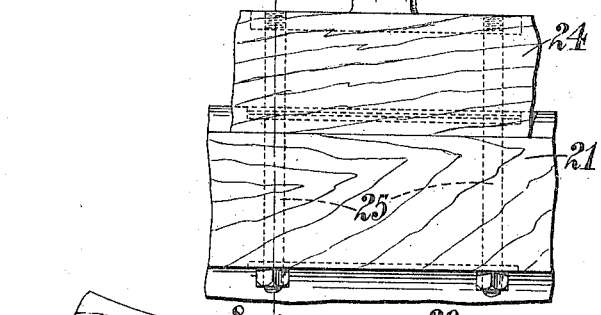
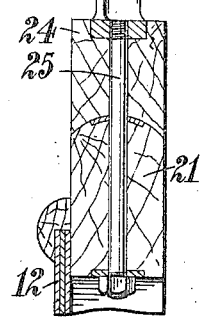
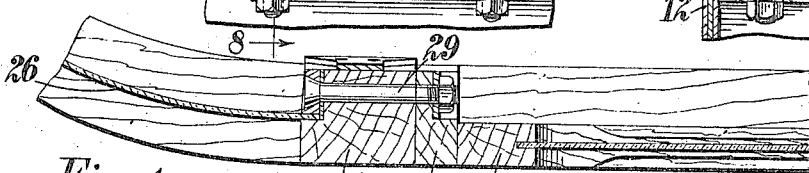
INVENTOR
George James Shave, Oct. 14, 1924.  
G. J. SHĀVE  
ROAD VEHICLE FOR PASSENGERS  
Filed March 10, 1923   2 Sheets-Sheet 2
1,511,844
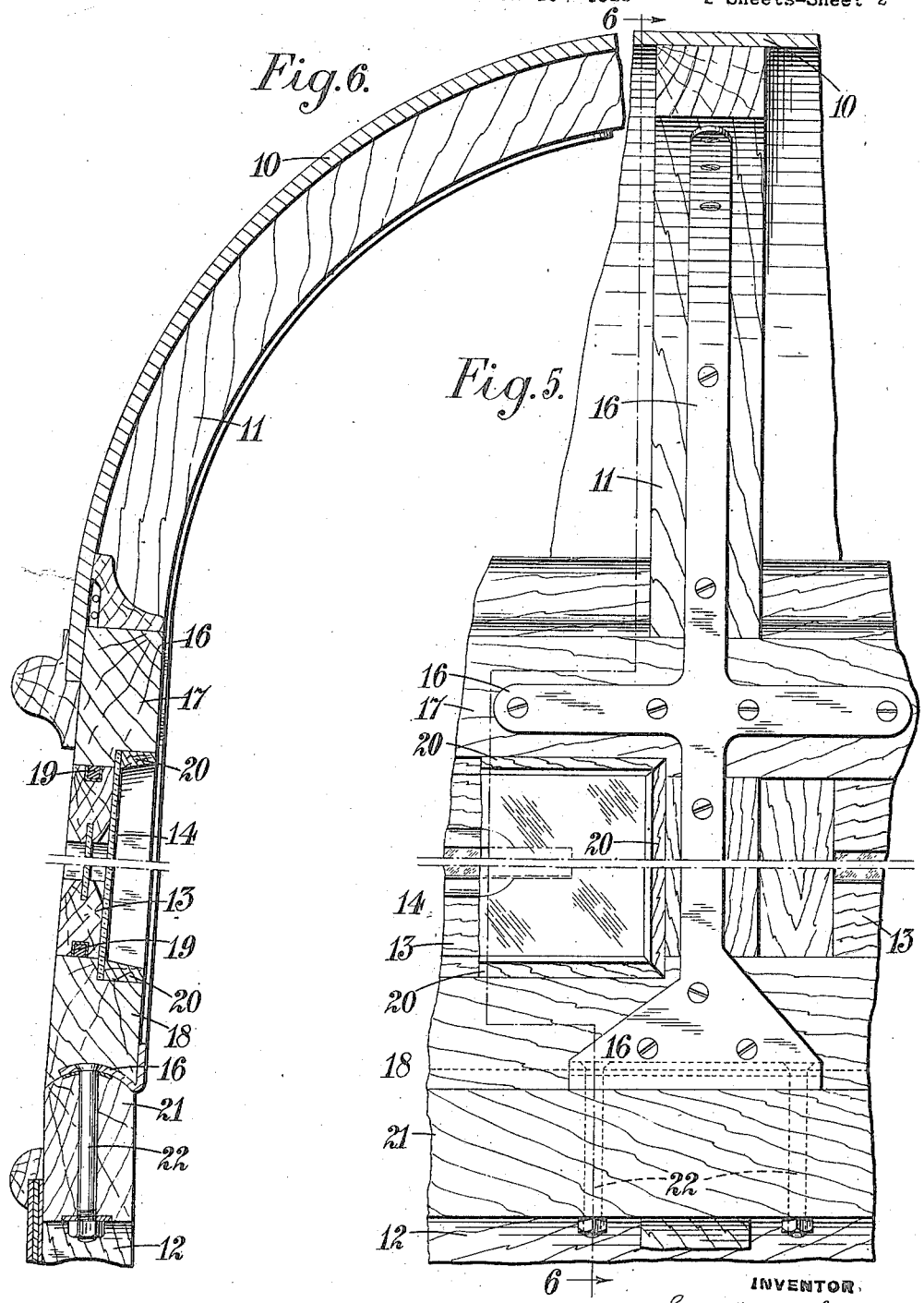
INVENTOR  
George James Shave  
Byrnes, Stebbins & Parmelee  
his attys.

Patented Oct. 14, 1924.

1,511,844

UNITED STATES PATENT OFFICE.

GEORGE JAMES SHAVE, OF WESTMINSTER, LONDON, ENGLAND, ASSIGNOR TO THE LONDON GENERAL OMNIBUS COMPANY, LIMITED, OF LONDON, ENGLAND, A BRITISH COMPANY.

ROAD VEHICLE FOR PASSENGERS.

Application filed March 10, 1923. Serial No. 624,182.

*To all whom it may concern:*

Be it known that I, GEORGE JAMES SHAVE, a subject of the King of England, residing at Westminster, London, England, have invented certain new and useful Improvements in Road Vehicles for Passengers, of which the following is a specification.

This invention is for improvements in or relating to road vehicles for passengers and has for one of its objects to provide a construction which shall be more convenient to passengers than the constructions at present in use.

According to the primary feature of the present invention a two-deck road vehicle for passengers, of the type having a covered-in upper deck with side windows which can be opened, is provided which is characterized in that the windows and roof of the upper deck are provided with supports adapted to be carried upon permanent parts of the vehicle in such a manner that the roof with certain of its supports and the windows carried thereby can be removed as an entity leaving other windows and supports in position. Conveniently the windows at the front of the upper deck of the vehicle are permanently mounted and may remain even though the other windows and roof are removed.

The invention is also concerned with the means for supporting the detachable members on the permanent parts of the vehicle and with other features of construction which will be hereinafter indicated.

For a more complete understanding of the invention there will now be described, by way of example only and with reference to the accompanying drawings, one constructional form of covering for the upper deck of a passenger road vehicle according to the invention. It is to be understood, however, that the invention is not limited to the precise constructional details set forth.

In these drawings:—

Figure 1 is a side elevation of the upper portion of the vehicle showing the roof covering and windows in place;

Figure 2 is a similar view but showing the roof and most of the windows removed and a detachable hand railing substituted;

Figure 3 is a view similar to Figure 2 but showing the whole of the windows removed;

Figure 4 is a cross-section on the line 4—4 of Figure 1, but on a scale larger than that of this latter figure;

Figure 5 is a partial internal view also on a scale larger than that of Figure 1;

Figure 6 is a section on the line 6—6 of Figure 5;

Figure 7 is a detail view of a portion of the detachable hand railing shown in Figure 2, but on a scale larger than that of this latter figure; and Figure 8 is a section on the line 8—8 of Figure 7.

Like reference numerals indicate like parts throughout the drawings.

The covering for the upper deck of the vehicle comprises a roof 10 with supports 11 which reach down to the permanent part 12 of the vehicle. Between the adjacent supports 11 slidable windows 13 are provided which when necessary can be slid outside fixed windows 14 so as to expose uncovered apertures such as 15. The supports 11 extend up under the skin of the roof and are stiffened by metal strips 16, while horizontal rails 17 and 18 form with the supports 11 and the roof skin a single entity. The rails 17 and 18 are provided with runners 19 to guide the sliding windows 13 and by making these runners detachable, it will be appreciated that the windows 13 can be individually removed as may be thought desirable. The fixed windows 14 are secured in place by strips 20 which can also be made removable if it is desired to remove individual fixed windows 14.

The lower rail 18 has a concave under face which is received upon the convex upper face of a permanent rail 21. This curved joint will be found of service in preventing the ingress of wet. The metal strips 16 reach under the rails 18 and carry bolts or studs 22 whereby the roof superstructure is fixed in place upon the rails 21.

When the roof superstructure is removed it is desirable to place upon the rail 21 a detachable hand railing 23. In this way the side of the vehicle can readily be brought to any required height above the surface of the upper deck. This railing 23 embodies a lower member 24, and fixing members 25 spaced the same distance apart as are the corresponding members 22. In this way the detachable roof supports and the alternative detachable hand railing are interchangeably mounted in place.

Referring to Figure 2 it will be seen that when the roof superstructure is removed the front windows 26 are left in place so as to serve as a wind screen for the passengers. The joint between this front to the upper deck, and the detachable roof, lies horizontally of the vehicle and is made against a downwardly directed face on the roof. In this way the ingress of wet will be prevented. The uprights 27 at the extremity of the front 26 may be secured to uprights 28 on the main roof superstructure by fixing members 29 (see Figure 4). Of course the front 26 may be individually removable if desired, in which case the top of the vehicle would have the appearance shown in Figure 3.

The adoption of a covered-in top, as aforesaid is facilitated by the sinking of the general level of the vehicle in the manner described in British Specification No. 19,495/22, and it will be found that a vehicle constructed as specified will be stable and satisfactory from the point of view of the comfort of the passengers, since those outside may be accommodated whatever the weather may be. It is not, however, essential to employ the subject matter of the present invention in conjunction with that of the aforesaid other specification. It will be seen that the top covering according to the present invention does not in any way preclude the employment in the same vehicle of the subject matter of British Specification No. 33,948/22.

It is to be understood that the invention is not limited to the precise constructional details hereinbefore set forth. For example the windows instead of being slidable horizontally can be made slidable vertically or they could be arranged to be individually opened in ways other than by sliding.

I claim:—

1. A two-deck road vehicle for passengers, comprising an upper deck covered in by a roof and side windows, supports for said roof and windows, a permanent rail upon the vehicle to receive the lower edges of the supports and means for fixing said supports to said rail in such manner that the roof with certain of its supports and the windows carried thereby can be removed as an entity leaving other windows and their supports in position.

2. A two-deck road vehicle for passengers, comprising an upper deck covered in by a roof and side windows, supports for said roof and windows, a permanent rail upon the vehicle having a convex upper surface to receive concave lower edges of the supports and means for fixing said supports to said rail in such manner that the roof with certain of its supports and the windows carried thereby can be removed as an entity leaving other windows and their supports in position.

3. A two-deck road vehicle for passengers, comprising an upper deck covered in by roof and side windows, supports for said roof and windows, a permanent rail upon the vehicle to receive the lower edges of the supports, and projecting fixing members on said supports to be received in holes in the said permanent rail whereby the roof with certain of its supports and the windows carried thereby can be removed as an entity leaving other windows and their supports in position.

In testimony whereof I affix my signature.

GEORGE JAMES SHAVE.